United States Patent [19]
Kang et al.

[11] Patent Number: 5,845,097
[45] Date of Patent: *Dec. 1, 1998

[54] BUS RECOVERY APPARATUS AND METHOD OF RECOVERY IN A MULTI-MASTER BUS SYSTEM

[75] Inventors: Ki B. Kang, Centreville, Va.; Dae S. Kang, Gaithersburg, Md.

[73] Assignee: Samsung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 657,371

[22] Filed: Jun. 3, 1996

[51] Int. Cl.⁶ .................................................. G06F 13/362
[52] U.S. Cl. ...................... 395/297; 395/185.08; 395/557
[58] Field of Search .................................... 395/297, 296, 395/293, 185.08, 557

[56] References Cited

U.S. PATENT DOCUMENTS

| | | | |
|---|---|---|---|
| 4,719,567 | 1/1988 | Whittington et al. | 395/297 |
| 4,969,720 | 11/1990 | Azevedo et al. | 395/292 |
| 5,202,966 | 4/1993 | Woodson | 395/297 |
| 5,241,632 | 8/1993 | O'Connell et al. | 395/297 |
| 5,377,332 | 12/1994 | Entwistle et al. | 395/297 |
| 5,499,345 | 3/1996 | Watanabe | 395/297 |
| 5,506,971 | 4/1996 | Gullette et al. | 395/296 |
| 5,560,016 | 9/1996 | Fiebrich et al. | 395/296 |
| 5,572,686 | 11/1996 | Nuniata et al. | 395/296 |
| 5,598,542 | 1/1997 | Leung | 395/297 |
| 5,623,672 | 4/1997 | Popat | 395/297 |
| 5,633,857 | 5/1997 | Kim et al. | 370/242 |
| 5,706,430 | 1/1998 | Yanagisawa et al. | 395/200.01 |

FOREIGN PATENT DOCUMENTS

| | | |
|---|---|---|
| 0 539 077 A1 | 4/1993 | European Pat. Off. . |
| 0 710 913 A1 | 5/1996 | European Pat. Off. . |
| 2 219 176 A | 11/1989 | United Kingdom . |
| WO 83/03910 | 11/1983 | WIPO . |

*Primary Examiner*—Meng-Ai T. An
*Assistant Examiner*—Xuan M. Thai
*Attorney, Agent, or Firm*—Jones & Volentine, L.L.P.

[57] ABSTRACT

A bus recovery system for multi-master bus system comprises a plurality of bus masters selectively interfacing with a system bus whereby access to the bus is controlled by a bus arbiter. A plurality of counters corresponding to each of the plurality of masters contains a pre-determined time value corresponding to the maximum time each of the plurality of masters may be granted access to bus. The arbiter releases ownership of the bus when the pre-determined time value in the counter has been exceeded by master currently accessing the bus. A register identifies which of the masters had access to the bus when the predetermined time value was exceeded.

6 Claims, 2 Drawing Sheets

BUS RECOVERY APPARATUS AND METHOD OF RECOVERY IN A MULTI-MASTER BUS SYSTEM

BACKGROUND OF THE INVENTION

1. Field of the Invention

The present invention generally relates to bus recovery operations, and more particularly, to a bus recovery system and method for use in a multi-master bus system.

2. Description of the Prior Art

In typical microprocessor systems the bus transports data among the processor and other components. The central processing unit (CPU) is usually the master of the bus, controlling the flow of data to and from the CPU and to the other components of the system, such as printers, memory, displays, and parallel and serial ports.

The single master concept was sufficient to control data traffic flow in the past. However, memory devices and application programs have gotten larger, computations have grown more complex, and video applications have become more prevalent. A single CPU is no longer able to handle and orchestrate the elaborate data flow needed for a smooth running system.

In an effort to relieve some of the burden on the CPU, multi-master schemes have been introduced. A math co-processor is an example of such a multi-master concept. Rather than have the CPU perform complex mathematical calculations, which is very slow, the data is sent to the dedicated math co-processor where the calculations are performed, freeing the CPU to perform another task. Other masters in a multi-master arrangement may be used for ethernet control as part of a local area network (LAN), video controllers, or some other customized operation.

In a multi-master configuration, access to the bus must be controlled and arbitrated since only one master can have access to the bus at any one time. A disadvantage associated with the multi-master bus architecture is that the system can hang if the "current master" hangs when it has access to the bus. Not only is it difficult to recover from the failure, it is also hard to analyze the cause of the problem.

Again, using the math co-processor as an example of a current master, if the math co-processor has access to the bus and hangs, the rest of the system is locked up because you cannot remove that current master.

In light of the foregoing, there exists a need for an apparatus and method for bus recovery in a multi-master system.

SUMMARY OF THE INVENTION

The present invention is directed to an bus apparatus and method of recovery in a multi-master system, which substantially obviates one or more of the problems due to the limitations and disadvantages of the related art.

In general, the present invention latches ownership of the bus at the time the bus is granted and starts a timer for the current master. If a pre-programmed duration is exceeded, the current master is forced to release the bus.

To achieve these and other advantages and in accordance with the purpose of the invention, as embodied and broadly described, the invention provides for a bus recovery system for multi-master bus system, comprising: a plurality of bus masters selectively interfacing with a system bus; a bus arbiter for receiving requests from the plurality of masters for access to the bus, the arbiter granting access to one of the plurality of the masters; and a plurality of counters corresponding to each of the plurality of masters, each of the counters containing a pre-determined time value corresponding to a maximum time each of the plurality of masters may be granted access to the bus, the arbiter releasing ownership of the bus when the pre-determined time value in the counter has been exceeded by one of the plurality of masters currently accessing the bus, and the arbiter granting access to the bus to a default master in response to the releasing of ownership of the current master.

The bus recovery system further includes a register for identifying which of the plurality of masters had access to the bus when the predetermined time value was exceeded.

In another aspect, the invention provides for a method for bus recovery in a multi-master bus system, comprising the steps of: (1) receiving requests from a plurality of bus masters for access to a system bus; (2) granting access to one of the plurality of masters; (3) starting counting of a pre-determined time value corresponding to a maximum time each of the plurality of masters may be granted access to the bus; (4) releasing ownership of the bus when the pre-determined time value has been exceeded by one of the plurality of masters currently accessing the bus; and (5) granting access to the bus to a default master in response to the releasing step.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
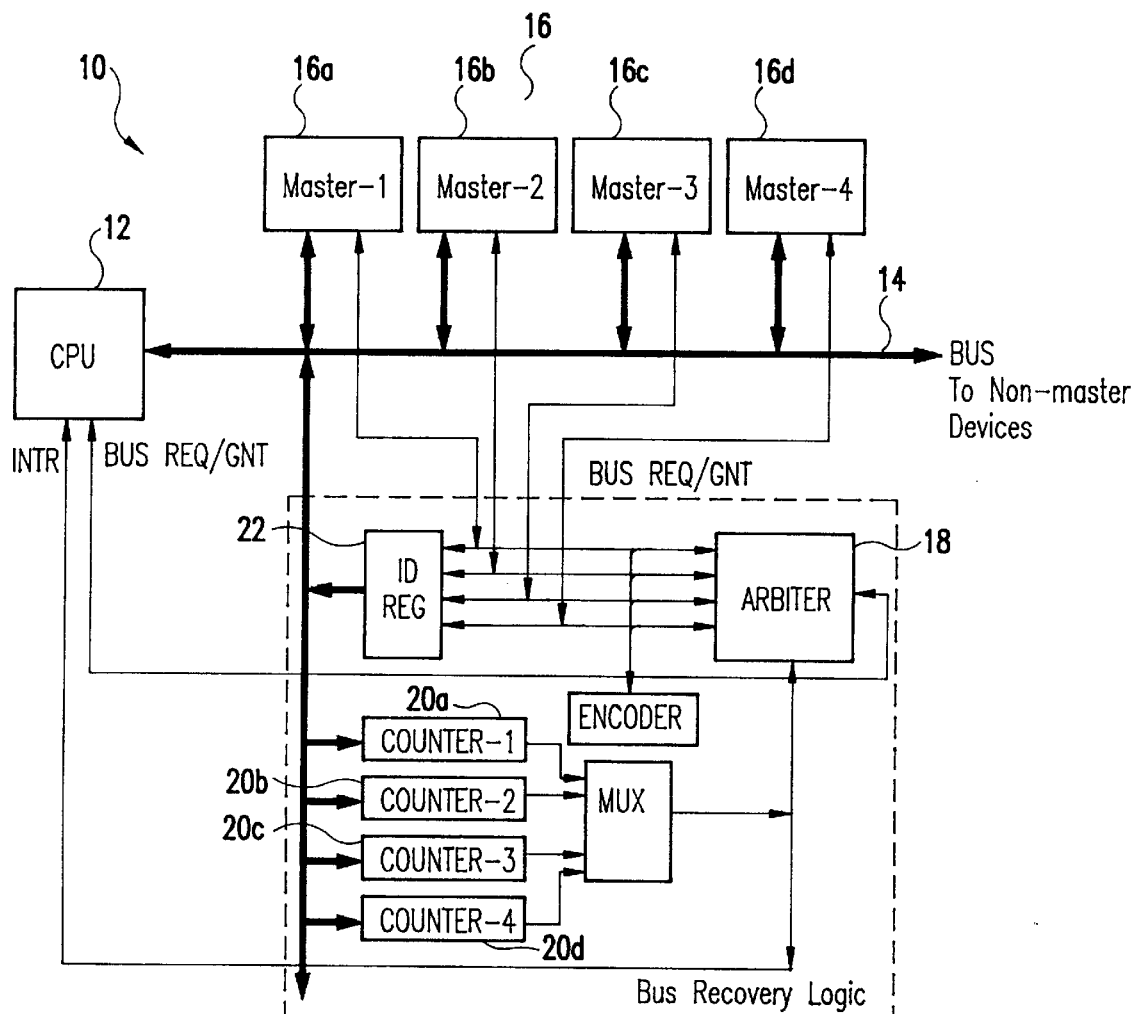
FIG. 1 is a block diagram of the components of the bus recovery scheme of the present invention.

The present invention is directed to a bus recovery scheme in a multimaster bus system. The multi-master bus system 10 consists of one default bus master, usually the CPU 12, which has ownership of the bus 14 during the normal state.

The multi-master bus system also includes a plurality of bus masters 16 (specifically, 16a, 16b, 16c, and 16d), which are selectively granted access to the bus 14. While four bus masters 16a–16d are shown in addition to the CPU 12, it is understood that, at a minimum, two masters (i.e., the CPU 12 and at least one master 16) are required to incorporate the multi-master bus recovery system of the present invention. Although the theoretical maximum number of masters 16 (Master-n) is unlimited, the practical maximum is that number that may be accommodated by the system without causing data traffic conflicts or an appreciable slowing down of the system.

As stated previously, a math co-processor would be an example of one type of master 16 in the multi-master concept. Other masters 16 in a multi-master arrangement may be used for ethernet control as part of a local area network (LAN), video controllers, or some other customized operation.

The arbiter 18 receives bus requests via bus request BUS REQ signals from each of the masters 16a–16d and selectively grants ownership of the bus via a GNT signal to one master based on a particular arbitration scheme. When access is granted by the arbiter 18 to one particular master 16, the identification of the master 16 is latched in the ID register 22. The master with access to the bus at any particular time is called the "current master" (Master-n). It is understood that many different arbitration schemes may be practiced within the scope of the present invention.

Counters 20a, 20b, 20c, and 20d are provided with a 1:1 correspondence between the masters and the counters. For example, with four masters 16a–16d there would be four counters 20a–20d (20n). For each counter 20 corresponding to the master 16, the value of the maximum time allowed for each master to be granted access to the bus 14 is stored in the counters 20. For example, the math co-processor master 16a may have a maximum grant time to the bus of 2 ms (milliseconds). The ethernet master 16b may have a maximum grant time of 1 ms. These grant time values are for illustrative purposes only, it being understood that the actual values would vary according to the function and applications of the bus system.

Once access is granted by the arbiter 18 to a current master, the recovery scheme starts counting down from the pre-determined maximum time value; if the current master (16a, 16b, 16c, or 16d) does not release the bus 14 by the expiration of the maximum time, the arbiter 18 forces the particular master to release ownership of the bus 14. Note that the identity of the current master has already been latched in the ID register 22. This information may be used later to analyze the fault as discussed below.

After release of the current master, bus ownership is given to the default bus master (CPU 12) for the next operation. The default master bus 12 is notified of this event via an interrupt signal INTR. This allows the bus system to be recovered despite a fault in one of the masters. The arbitration scheme may allow for either the current master to retry access to the bus 14 or it may be structured so as to not grant further access to that particular master to prevent further bus hang-ups.

The ID register 22 contents are read to find out which master caused the violation, based on the identifier previously stored at the start of the recovery scheme. In this way, a system manager would know which master 16 had access to the bus when the bus hung-up. A decision could be made to fix the system, bypass the faulty master and assign its function to another master, or simply not perform the faulty function.

Figure 2:
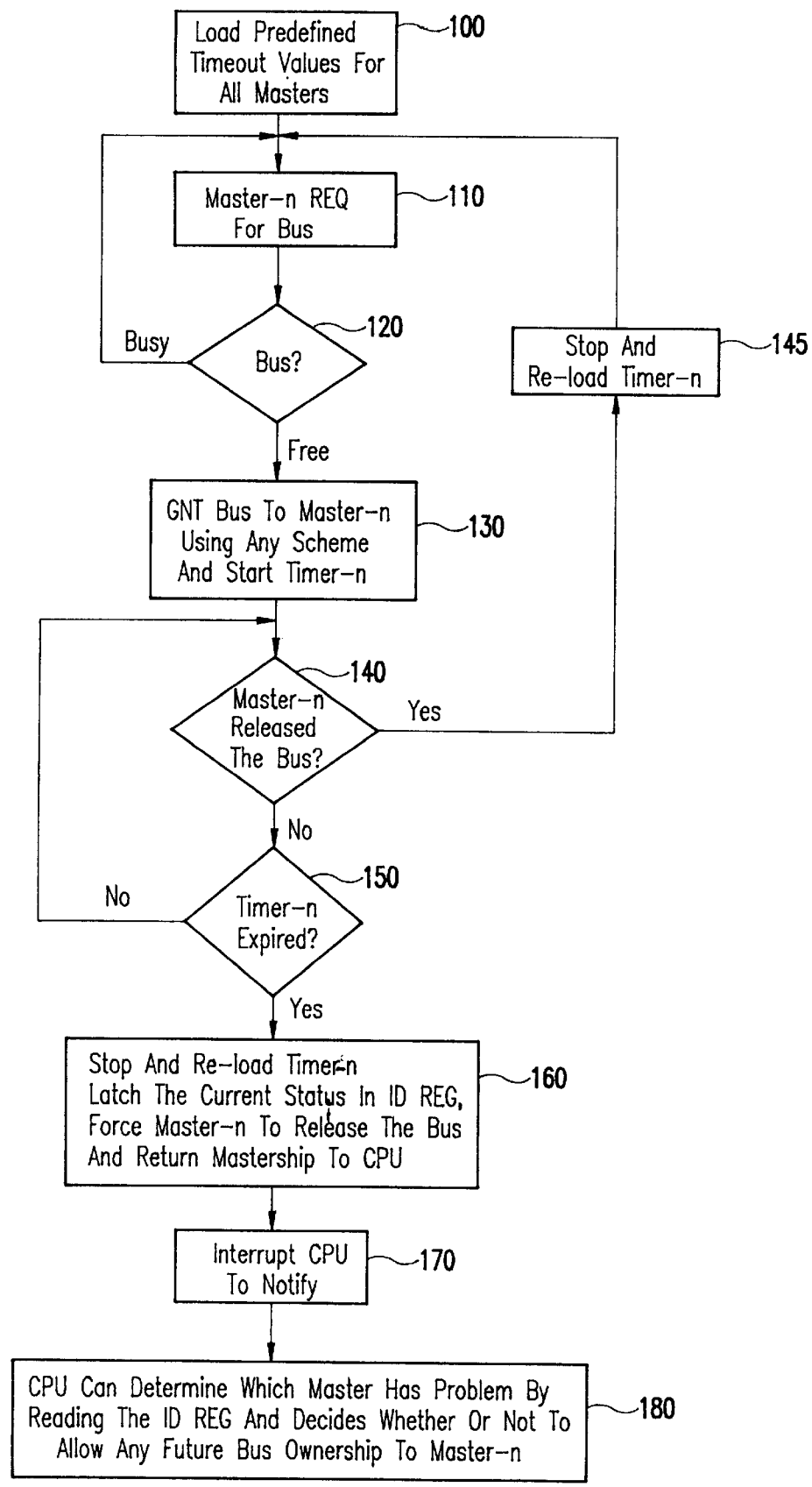
FIG. 2 is a flow diagram of the method of the present invention.

FIG. 2 illustrates the method of the present invention. First, in Step 100, the predefined timeout values corresponding to the masters 16n (Master-n) of the system are loaded in corresponding counters 20n. In the example depicted in FIG. 1, there are four masters and four counters.

In Step 110, one of the masters (Master-n) requests access to the bus 14 via the REQ signal. In Step 120, if the bus 14 is busy when the REQ signal is received by the arbiter 18, Master-n will retry at a later time. If the bus 14 is free when the REQ signal is received by the arbiter 18, Master-n is granted access to the bus 14.

In Step 130, once access is granted by the arbiter 18 to a particular Master-n via the GNT signal, the timer is started in the counter 20n corresponding to Master-n. In decision Step 140, if Master-n has released the bus 14 after performing a designated function without a hang-up, the timer is stopped and reloaded in the corresponding counter 20n (Step 145).

If Master-n has not released the bus 14, the system checks whether the timer in counter 20n has expired (Step 150). If the bus access time for Master-n has not expired, Master-n retains access to the bus 14, and the loop continues.

In Step 160, if the bus access time has been exceeded, the current status of Master-n is latched in the ID register 22, the timer is stopped and reloaded in counter 20n, and Master-n is forced to release the bus 14. Bus mastership is returned to the default bus master (CPU 12) via the INTR signal (Step 170).

The CPU 12 can then determine which Master-n had a problem by reading the ID register 22 and decide whether or not to allow any future bus ownership to Master-n (Step 180).

The present inventive apparatus and method, therefore, serves a dual purpose. First, it allows for bus recovery in a multi-master bus system so as not to hang up the bus if one particular master is faulty. Second, the counters 20 and ID register 22 allow for troubleshooting and maintenance of the system by reference to the particular master that caused the bus to hang up.

While the invention has been described in terms of the embodiments described above, those skilled in the art will recognize that the invention can be practiced with modification within the spirit and scope of the appended claims.

Having thus described my invention, what we claim as new and desire to secure by Letters Patent is as follows:

1. A bus recovery system for multi-master bus system, comprising:
   a plurality of bus masters selectively interfacing with a system bus, one of said bus masters being a default bus master;
   a plurality of counters corresponding to each of said plurality of bus masters, each of said counters containing a pre-determined time value corresponding to a maximum time each of said plurality of bus masters may be granted access to said bus;
   a bus arbiter for receiving requests from said plurality of bus masters for access to said bus, said arbiter granting access to one of said plurality of said bus masters and initiating counting by one of said plurality of counters corresponding to said one of said plurality of bus masters;
   a register for identifying and storing which one of said plurality of bus masters was currently accessing said bus when said pre-determined time value in said one of said plurality of counters has been exceeded by said one of said plurality of masters currently accessing said bus,
   said arbiter releasing ownership of said bus when said pre-determined time value in said counter has been exceeded by said one of said plurality of bus masters currently accessing said bus, and
   said arbiter granting access to said bus to said default bus master in response to said releasing ownership of said bus by the current bus master.

2. A bus recovery system as in claim 1, wherein said masters comprise one of a math co-processor, an ethernet controller, and a video controller.

3. A method for bus recovery in a multi-master bus system having a plurality of bus masters and a plurality of counters corresponding to each of said plurality of bus masters, one of said bus masters being a default bus master, said method comprising:
   loading a pre-determined time value in each of said plurality of counters indicative of a maximum time each of said plurality of bus masters may be granted access to said bus;

receiving requests from said plurality of bus masters for access to said system bus;

granting access to one of said plurality of bus masters;

counting the pre-determined time value in one of said plurality of counters corresponding to said one of said plurality of bus masters currently accessing said bus;

identifying and storing in a register which one of said plurality of bus masters was currently accessing said bus when said predetermined time value in said one of said plurality of counters has been exceeded;

releasing ownership of said bus when said pre-determined time value in said one of said plurality of counters has been exceeded by said one of said plurality of bus masters currently accessing said bus; and granting access to said bus to said default bus master in response to said releasing ownership of said bus by said one of said plurality of bus masters.

4. A method of bus recovery as in claim 3, further including said default bus master interrogating said register to determine an identity for said one of said plurality of bus masters which was accessing said bus when said predetermined time value has been exceeded.

5. A method of bus recovery as in claim 4, further including said register providing to said default bus master said identity for said one of said plurality of bus masters which was accessing said bus when said predetermined time value has been exceeded.

6. A method of bus recovery as in claim 5, further including rejecting a future bus access request from said one of said plurality of bus masters which was accessing said bus when said predetermined time value has been exceeded.

* * * * *